(12) United States Patent
Kim et al.

(10) Patent No.: US 10,933,727 B2
(45) Date of Patent: Mar. 2, 2021

(54) ENGINE MOUNT EMBEDDED WITH DAMPER

(71) Applicants: Hyundai Motor Company, Seoul (KR); Kia Motors Corporation, Seoul (KR)

(72) Inventors: Seung-Won Kim, Seoul (KR); Hyo-Seok Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 16/808,335

(22) Filed: Mar. 3, 2020

(65) Prior Publication Data

US 2020/0198454 A1 Jun. 25, 2020

Related U.S. Application Data

(62) Division of application No. 16/127,511, filed on Sep. 11, 2018, now Pat. No. 10,654,352.

(30) Foreign Application Priority Data

Nov. 24, 2017 (KR) .......................... 10-2017-0158219

(51) Int. Cl.
*F16M 11/00* (2006.01)
*B60K 5/12* (2006.01)
*F16F 13/22* (2006.01)

(52) U.S. Cl.
CPC ............ *B60K 5/1208* (2013.01); *F16F 13/22* (2013.01); *B60K 5/1216* (2013.01); *F16F 2230/0005* (2013.01)

(58) Field of Classification Search
CPC . F16F 13/10; F16F 13/04; F16F 13/26; B60G 13/067
See application file for complete search history.

(56) References Cited

U.S. PATENT DOCUMENTS

| | | | |
|---|---|---|---|
| 5,971,376 A | 10/1999 | Mori et al. | |
| 7,140,603 B2 | 11/2006 | Maeno et al. | |
| 9,057,417 B2 * | 6/2015 | Kato | .................... F16F 13/101 |
| 9,487,072 B2 | 11/2016 | Tsutsumi et al. | |
| 2012/0267184 A1 * | 10/2012 | Joly | ........................ F16F 13/10 |
| | | | 180/291 |
| 2018/0201112 A1 * | 7/2018 | Takahashi | ............ B60K 5/1216 |
| 2019/0072151 A1 * | 3/2019 | Kim | ..................... F16F 13/103 |

* cited by examiner

*Primary Examiner* — Amy J. Sterling
(74) *Attorney, Agent, or Firm* — Mintz Levin Cohn Ferris Glovsky and Popeo, P.C.; Peter F. Corless

(57) ABSTRACT

An engine mount which connects an engine to a vehicle body is provided. The engine mount includes a housing which defines a body of the engine mount and a main rubber body that is installed within the housing and defines a space portion that accommodates a fluid that flows through a nozzle plate. A core is inserted into and fixed to the main rubber body and an a fixing bolt is coupled to the core. A lower support bracket is coupled to the vehicle body and the fixing bolt is inserted therein. A damper that attenuates vibration is disposed at a lower side of the core or at first and second ends of the lower support bracket of the of the engine mount.

1 Claim, 12 Drawing Sheets

RELATED ART

RELATED ART

FIG. 5A           FIG. 5B
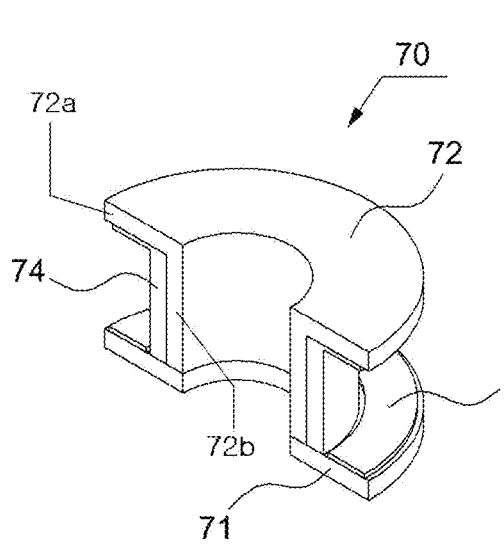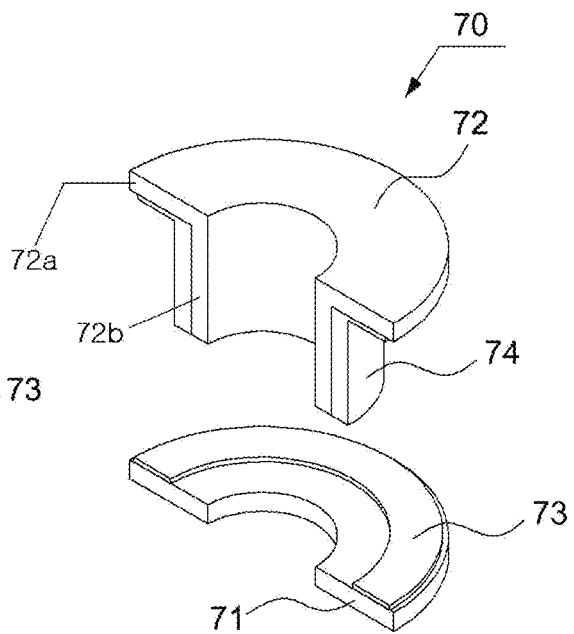

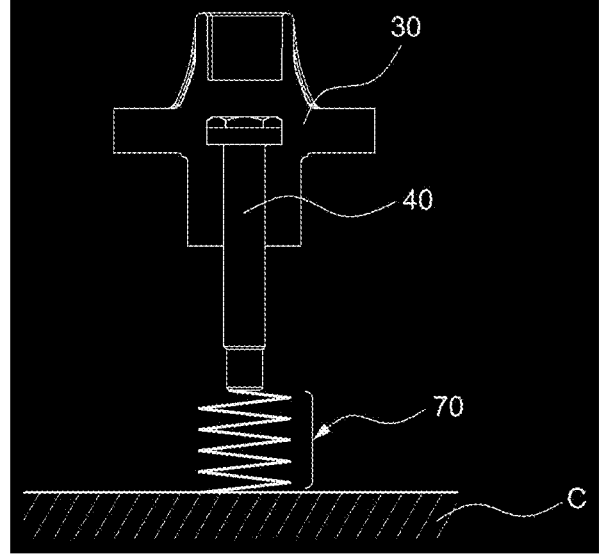

ENGINE MOUNT EMBEDDED WITH DAMPER

CROSS-REFERENCE TO RELATED APPLICATIONS

This application is a divisional application of U.S. application Ser. No. 16/127,511, filed Sep. 11, 2018, which claims priority to Korean Patent Application No. 10-2017-0158219 filed on Nov. 24, 2017, the disclosure of which is incorporated herein by reference in its entirety.

BACKGROUND

1. Field of the Invention

The present invention relates to an engine mount which connects an engine to a vehicle body, and more particularly, to an engine mount having a configuration in which a damper for attenuating vibration is installed at a lower side of a core of the engine mount or a configuration in which dampers are installed at ends of a lower support bracket of the engine mount.

2. Description of the Related Art

An engine mount is used to fix an engine to a vehicle body. In general, the engine mount is a component which is coupled between the vehicle body and the engine using a bracket, and a mass damper with a predetermined weight is used by being attached to the bracket to prevent noise from being transmitted through the bracket while the engine operates.

FIG. 1 illustrates an engine mount 1 in the related art to which the mass damper is attached. The engine mount 1 has a configuration in which an engine is coupled to a vehicle body by using a lateral bracket 3 and an upper bracket 4 which are installed at a lateral portion and an upper portion of a main body 2 of the engine mount 1, respectively. Additionally, a mass damper 5, which has a predetermined weight, is attached to the upper bracket 4 to prevent noise from being transmitted through the upper bracket 4. However, an overall weight increases as the mass damper 5 is used, which is disadvantageous for reduction of fuel consumption, and a technology adopting an inverse type engine mount has been developed to address the disadvantage.

The inverse type engine mount is an engine mount which has a configuration in which the mount is turned upside down and connected to the bracket when a nozzle plate part having an orifice is directed upward. In particular, the nozzle plate part operates as the mass damper of the bracket, and as a result, it is possible to prevent the transmission of noise through the bracket without requiring a separate mass damper. However, the inverse type engine mount has a low first natural frequency, which causes resonance while the vehicle is being driven, and as a result, there is a problem that a new mode of vibration and noise occurs.

FIG. 2 is a graph illustrating a measured vibration performance of the inverse type engine mount in the related art, in which an X axis indicates a frequency caused by vehicle vibration, and a Y axis indicates a magnitude (dB) of vibration. Referring to the graph, a magnitude of the vibration is increased to 150 dB as the bracket of the engine mount resonates at a frequency band of 250 Hz caused by vehicle vibration. Therefore, a separate dynamic damper, which has a predetermined weight, is attached to the inverse type engine mount to solve the problem of vibration and noise caused by a reduction in natural frequency when the inverse type engine mount is used.

However, similar to the engine mount in the related art which has been described with reference to FIG. 1, the configuration that requires as separate dynamic damper causes an increase in manufacturing costs due to the added dynamic damper, the increased weight is disadvantageous for improving fuel economy, separate packaging is required to install the dynamic damper, and as a result, there is a drawback that expandability and versatility toward other vehicle bodies or engine structures deteriorate.

SUMMARY

The present invention provides a configuration of an engine mount capable of solving a problem of vibration and noise caused by resonance due to a low first natural frequency of an inverse type engine mount, preventing an increase in manufacturing costs and weight caused by an added separate dynamic damper in the related art, and facilitating expandability and versatility toward other vehicle bodies or engine structures.

An exemplary embodiment of the present invention provides an engine mount embedded with a damper, which has a configuration in which a damper for attenuating vibration may be installed at a lower side of a core of the engine mount or a configuration in which dampers may be installed at a first end and a second end of a lower support bracket of the engine mount.

The engine mount embedded with a damper according to the present invention may reduce vibration and noise caused at or near a first natural frequency of an inverse type engine mount in the related art. The present invention may reduce manufacturing costs by removing a dynamic damper that has a predetermined weight in the related art, improve fuel economy by reducing weight, and facilitate expandability and versatility toward other vehicle bodies or engine structures since separate packaging for mounting a dynamic damper is not required.

BRIEF DESCRIPTION OF THE DRAWINGS

A brief description of each drawing is provided to more sufficiently understand drawings used in the detailed description of the present invention.

FIGS. 5A-5B are detailed views of the damper of the engine mount of the first exemplary embodiment of the present invention;

FIG. 6 illustrates an operational concept of the damper of the engine mount of the first exemplary embodiment of the present invention;

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, a configuration and an operation of an engine mount embedded with a dynamic damper according to the present invention will be described in detail with reference to the accompanying drawings. However, the disclosed drawings are provided as an example for transferring the spirit of the present invention to those skilled in the art. Therefore, the present invention is not limited to the drawings disclosed below, and may be specified as other aspects.

Unless otherwise defined, the terminologies used in the specification of the present invention have the meanings that a person with ordinary skill in the technical field to which the present invention pertains typically understands, and in the following description and the accompanying drawings, a detailed description of publicly known functions and configurations will be omitted so as to avoid unnecessarily obscuring the subject matter of the present invention.

Figure 1:
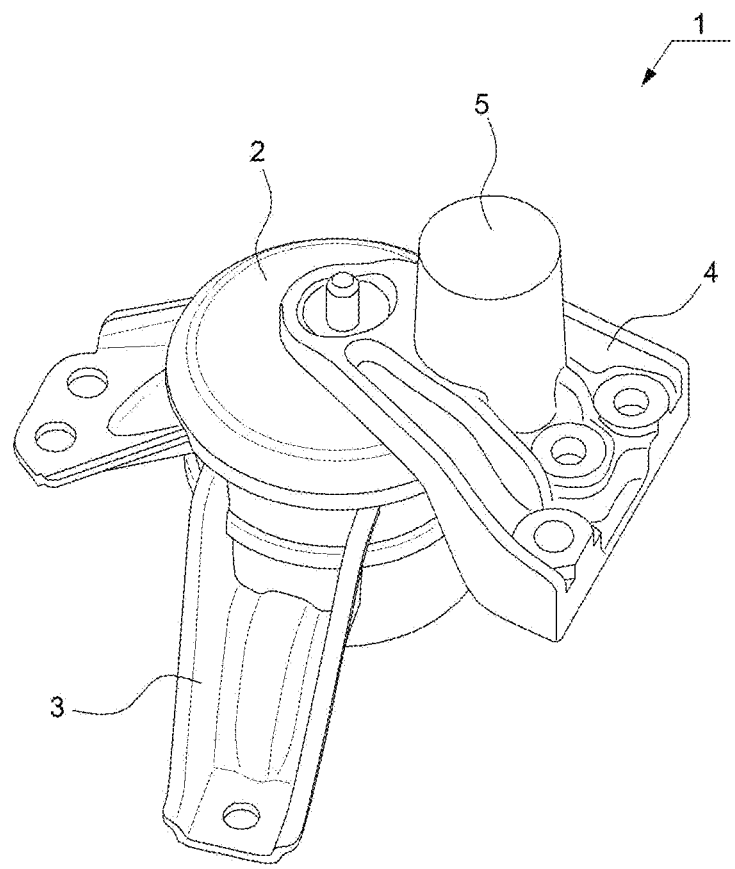
FIG. 1 is a configuration view of an engine mount in which a mass damper in the related art is installed.
Figure 2:
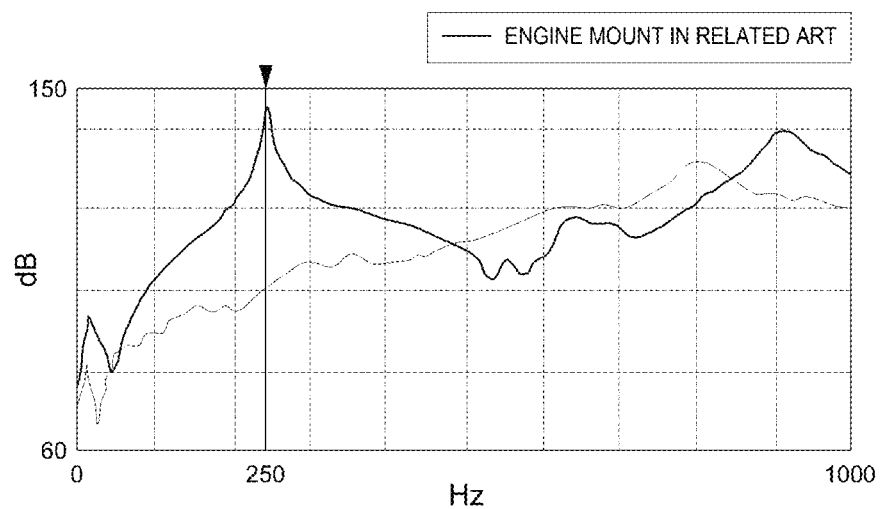
FIG. 2 is a graph illustrating a measured vibration performance of an inverse type engine mount in the related art.
Figure 3:
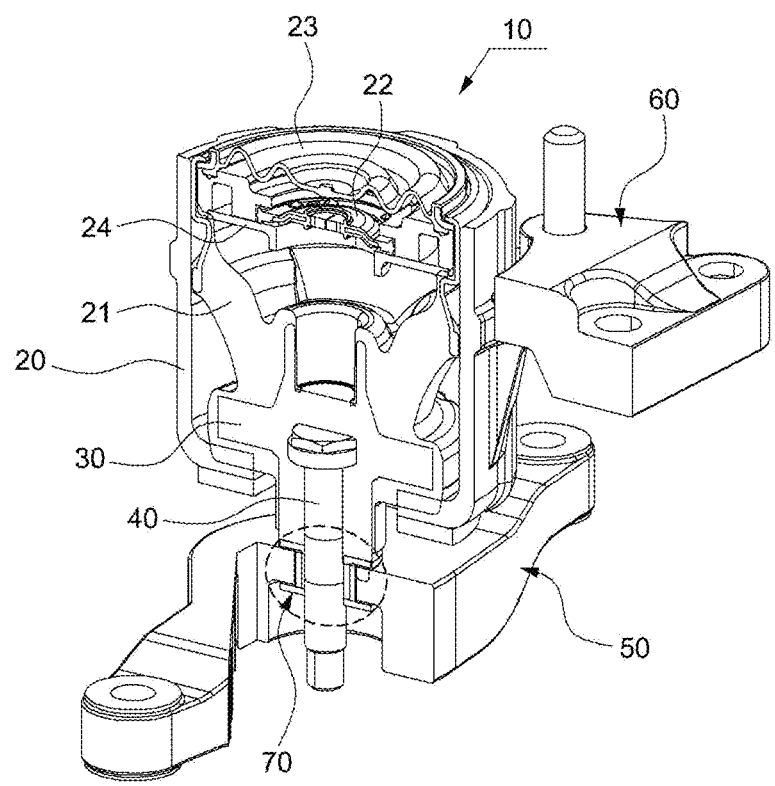
FIG. 3 is a partial cut-away perspective view of an engine mount of a first exemplary embodiment of the present invention.

FIG. 3 is a partial cut-away perspective view of an engine mount of a first exemplary embodiment of the present invention. Referring to FIG. 1, the configuration of an engine mount 10 of the first exemplary embodiment of the present invention is an inverse type engine mount in which the mount is disposed upside down (e.g., inverted) and connected to the bracket with a nozzle plate part directed upward.

Specifically, the engine mount 10 of the first exemplary embodiment of the present invention is an inverse type engine mount, and may include a housing 20 which defines an external appearance of a body of the engine mount, a main rubber body 21 disposed within the housing 20 and defines a space portion that contains a fluid that flows through a nozzle plate 24, a core 30 inserted into and fixed to a lower portion of the main rubber body 21, a fixing bolt 40 coupled to the core 30, a lower support bracket 50 into which the fixing bolt 40 may be inserted to mount the housing 20 coupled to a vehicle body, an upper support bracket 60 attached to an upper portion of the housing 20 and coupled to an engine, and a damper 70 disposed at a lower side of the core 30 and installed in the lower support bracket 50 such that the fixing bolt 70 penetrates the damper 70. The engine mount 10 may have the nozzle plate 24 that includes an orifice through which the fluid flows upward from the main rubber body 21, a membrane 22 which is inserted into the nozzle plate 24, and a diaphragm 23 which is coupled to an upper side of the nozzle plate 24 and closes the housing 20.

Figure 4:
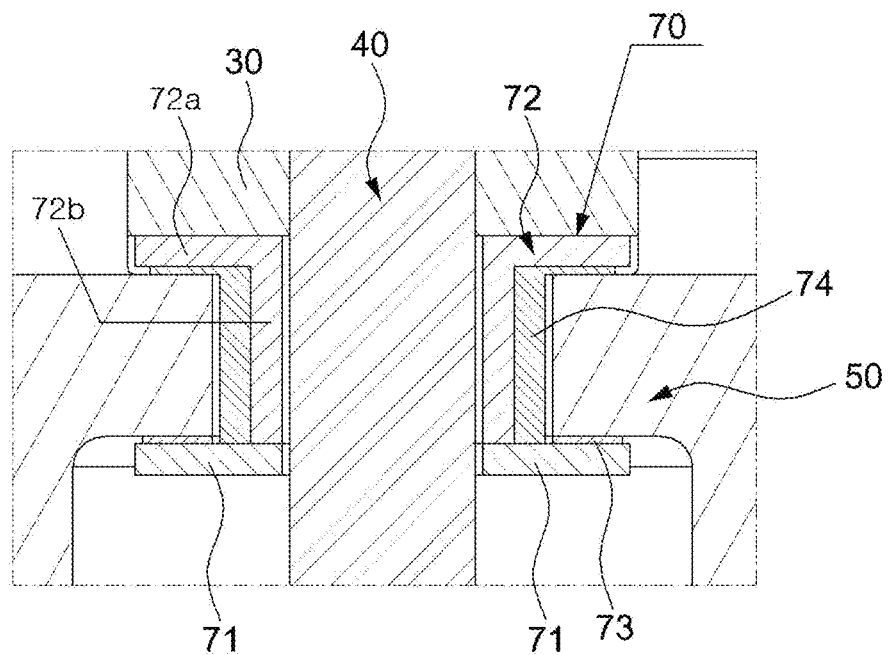
FIG. 4 is a cross-sectional view of a damper of the engine mount of the first exemplary embodiment of the present invention.

FIG. 4 is a cross-sectional view of the damper of the engine mount of the first exemplary embodiment of the present invention, FIGS. 5A-5B are detailed views of the damper of the engine mount of the first exemplary embodiment of the present invention, and FIG. 6 illustrates an operational concept of the damper of the engine mount of the first exemplary embodiment of the present invention.

As illustrated in FIGS. 4 and 5A-5B, the damper 70 may have a substantially cylindrical shape and include a base 71 formed in a circular and flat plate shape and configured to be penetrated by the fixing bolt 40, and a washer 72 coupled to an upper side of the base 71 and includes a circular upper plate 72a and a cylindrical body 72b that extends downward from the upper plate 72a such that the fixing bolt 40 may penetrate into the upper plate 72a and the body 72b. A base rubber body 73 may be attached to a surface of the base 71, and a washer rubber body 74 may be attached to an outer circumferential surface of the body 72b of the washer 72 and a lower bottom surface of the upper plate 72a of the washer 72, respectively.

Figure 7:
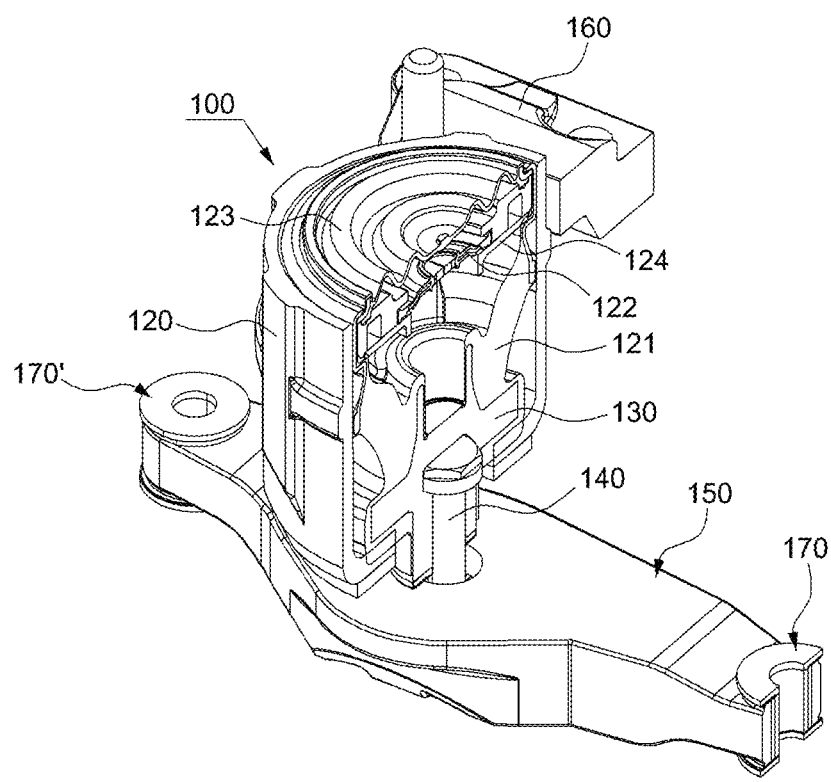
FIG. 7 is a partial cut-away perspective view of an engine mount of a second exemplary embodiment of the present invention.

As illustrated in the operational concept of the damper 70 in FIG. 6, the damper 70 may be disposed between the fixing bolt 40 and a vehicle body C and may function as an elastic body for attenuating vibration of the engine which is transmitted through the core 30 and the fixing bolt 40 via the main rubber body 21, thereby attenuating the vibration. FIG. 7 is a partial cut-away perspective view of an engine mount of a second exemplary embodiment of the present invention. Similar to the aforementioned engine mount 10 of the first exemplary embodiment, an engine mount 100 of the second exemplary embodiment of the present invention is an inverse type engine mount.

Figure 8:
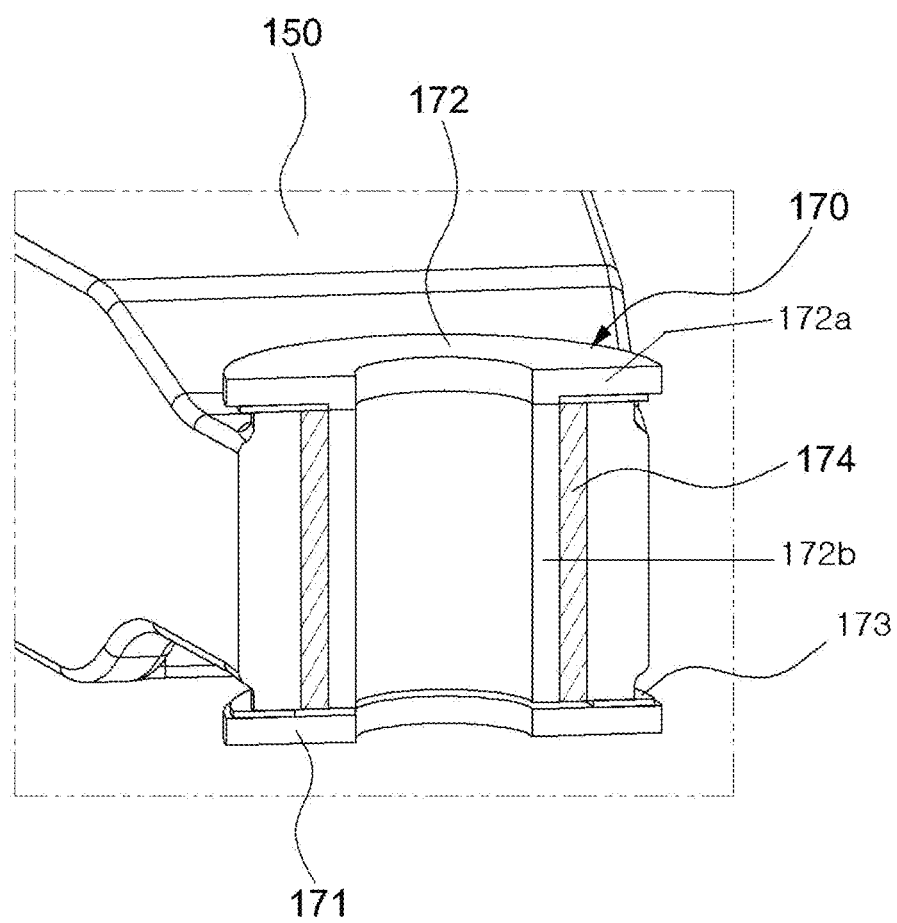
FIG. 8 is a cross-sectional view of a damper of the engine mount of the second exemplary embodiment of the present invention.
Figure 9:
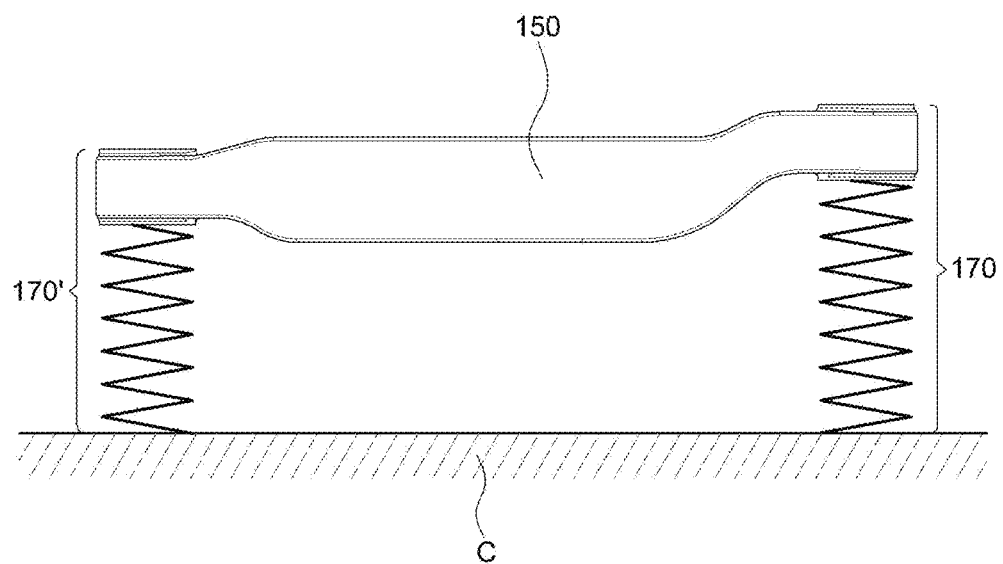
FIG. 9 illustrates an operational concept of the damper of the engine mount of the second exemplary embodiment of the present invention.

In particular, the engine mount 100 of the second exemplary embodiment of the present invention is an inverse type engine mount, and may include a housing 120 which defines an external appearance of a body of the engine mount, a main rubber body 121 installed within the housing 120 and defines a space portion that accommodates a fluid that flows through a nozzle plate 124, a core 130 inserted into and fixed to a lower portion of the main rubber body 121, a fixing bolt 140 coupled to the core 130, a lower support bracket 150 into which the fixing bolt 140 may be inserted and which is coupled to a vehicle body, an upper support bracket 160 which is attached to an upper portion of the housing 120 and configured to be coupled to an engine, and a pair of dampers 170 and 170' coupled to a first end and a second end of the lower support bracket 150, respectively FIG. 8 is a cross-sectional view of a damper of the engine mount of the second exemplary embodiment of the present invention, and FIG. 9 illustrates an operational concept of the damper of the engine mount of the second exemplary embodiment of the present invention. As illustrated in FIG. 8, the dampers 170 and 170' may have substantially the same configuration as the damper 70 of the first exemplary embodiment.

In particular, the damper 170 may be formed in a substantially cylindrical shape and include a base 171 formed in a circular and flat plate shape and configured to be penetrated by the fixing bolt 140, and a washer 172 coupled to an upper side of the base 171 and includes an upper plate 172a that is an upper portion of the washer 172, and a cylindrical body 172b that extends downward from the upper plate 172a, such that the fixing bolt 140 may penetrate the washer 172. A base rubber body 173 may be attached to a surface of the base 171, and a washer rubber body 174 may be attached to an outer circumferential surface of the body 172b of the washer 172 and a lower bottom surface of the upper plate 172a of the washer 172, respectively. As illustrated in the operational concept of the dampers 170 and 170' in FIG. 9, the dampers 170 and 170' may be disposed between the lower support bracket 150 and the vehicle body C and may function as elastic bodies for attenuating vibration of the engine which is transmitted through the main rubber body 121, the core 130, the fixing bolt 140, and the lower support bracket 150, thereby attenuating the vibration.

Figure 10:
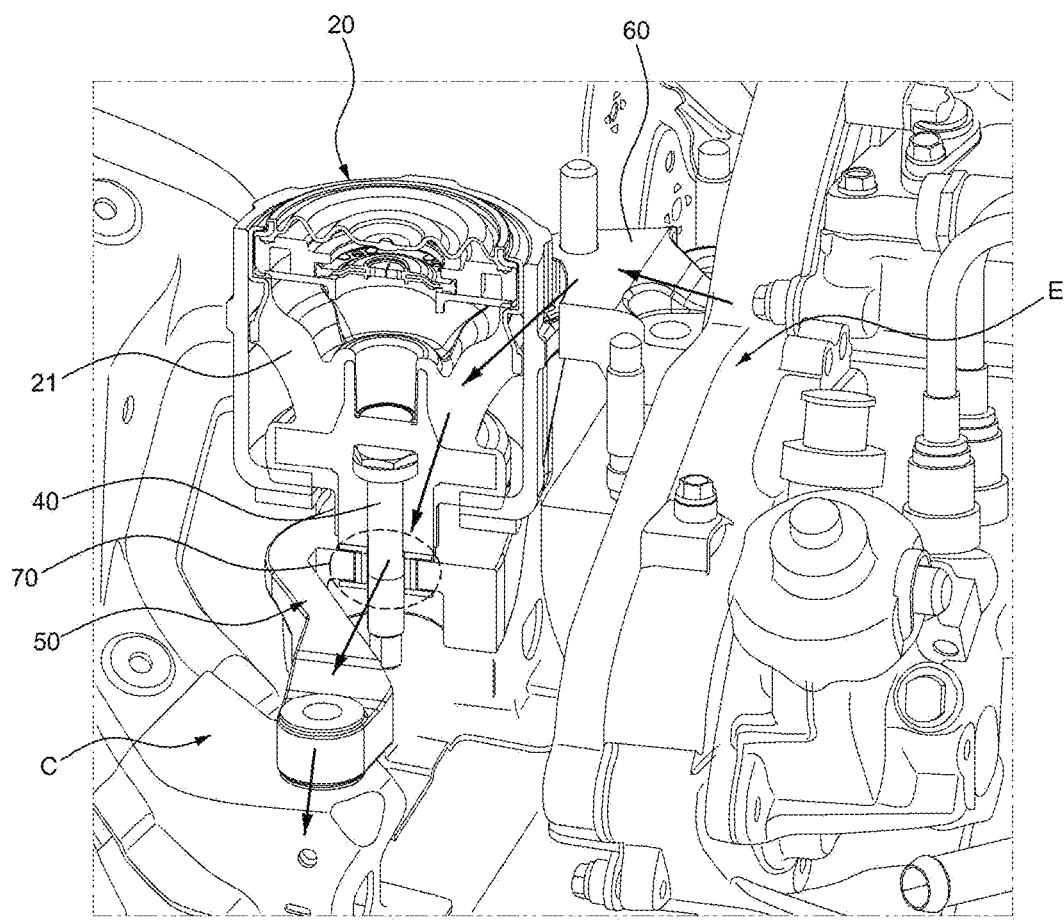
FIG. 10 is a view illustrating an operating state of the engine mount of the first exemplary embodiment of the present invention.
Figure 11:
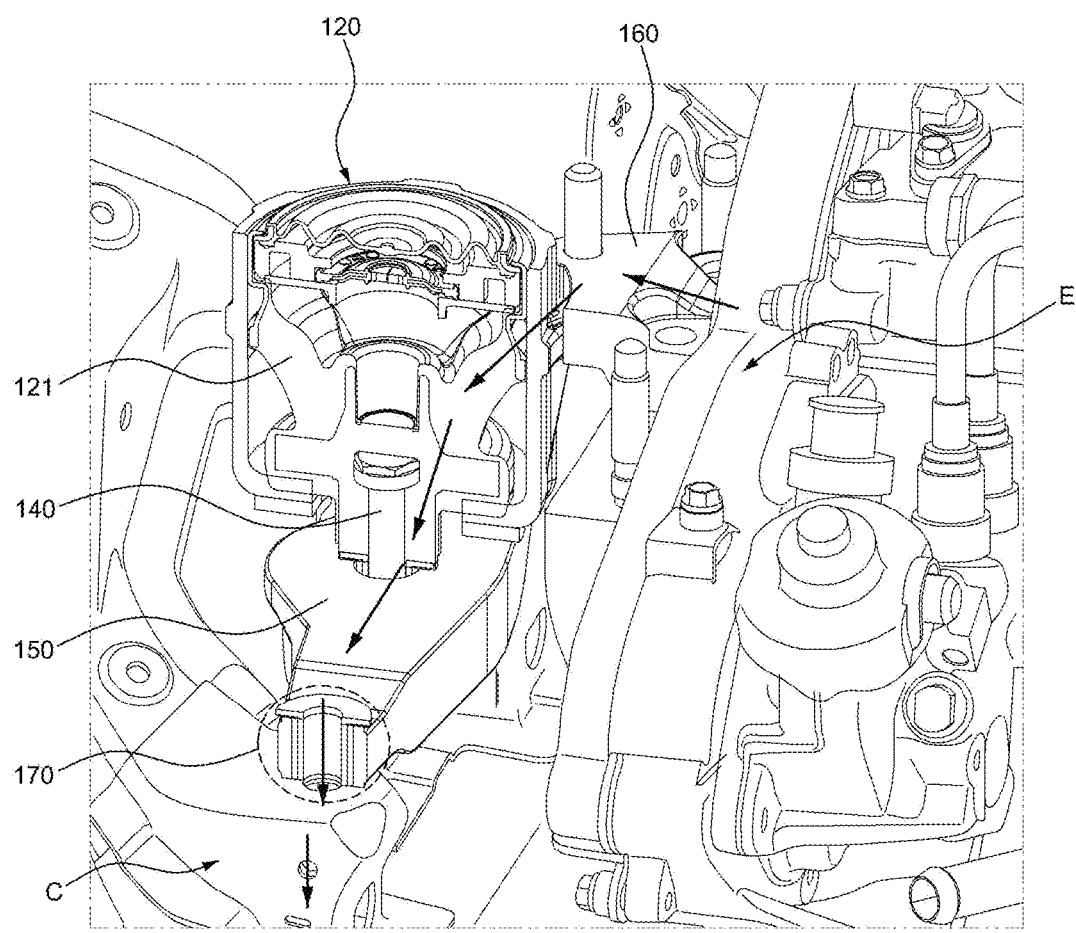
FIG. 11 is a view illustrating an operating state of the engine mount of the second exemplary embodiment of the present invention.

FIG. 10 is a view illustrating an operating state of the engine mount of the first exemplary embodiment of the present invention, and FIG. 11 is a view illustrating an operating state of the engine mount of the second exemplary embodiment of the present invention. First, an operation of the engine mount 10 of the first exemplary embodiment of the present invention will be described with reference to FIG. 10. The vibration generated in the engine E may be transmitted into the engine mount 10 through the upper support bracket 60 of the engine mount 10, and transmitted to the damper 70 via the main rubber body 21, the core 30, and the fixing bolt 40 of the engine mount 10.

Subsequently, while the vibration is attenuated by the washer rubber body 74 attached to the washer 72 of the damper 70 and the base rubber body 73 attached to the base 71 of the damper 70, the attenuated vibration may be transmitted to the vehicle body C through the lower support bracket 50.

Further, an operation of the engine mount 100 of the second exemplary embodiment of the present invention will be described with reference to FIG. 11. The vibration generated in the engine E may be transmitted into the engine mount 100 through the upper support bracket 160 of the engine mount 100, and transmitted to the lower support bracket 150 via the main rubber body 121, the core 130, and the fixing bolt 140 of the engine mount 100. Subsequently, the vibration transmitted to the lower support bracket 150 may be transmitted to the dampers 170 installed at a first end and a second end of the lower support bracket 150, respectively, and the vibration may be transmitted to the vehicle body C while being attenuated by the washer rubber body 174 attached to the washer 172 of the damper 170 and the base rubber body 173 attached to the base 171 of the damper 170.

Figure 12:
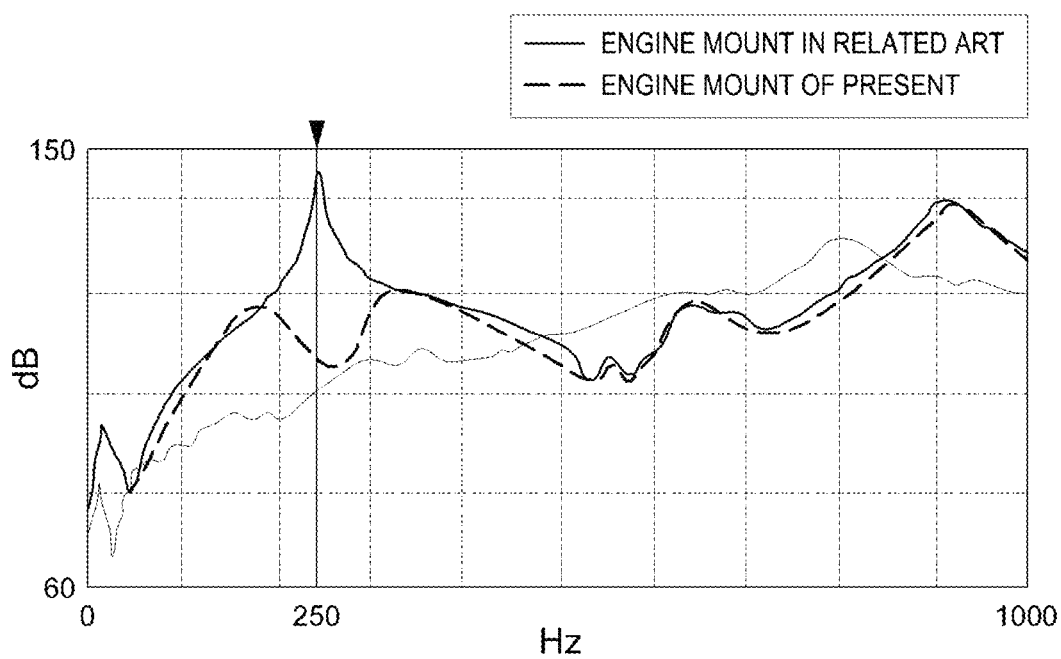
FIG. 12 is a graph illustrating a measured vibration performance of the engine mount according to an exemplary embodiment of the present invention.

Therefore, the vibration, which is transmitted to the inverse type engine mount, may be attenuated by the damper 70 of the first exemplary embodiment of the present invention and the dampers 170 of the second exemplary embodiment of the present invention which are operated as described above. The graph in FIG. 12, which indicates measured vibration performances of the engine mount of the present invention, shows that for both the damper 70 of the first exemplary embodiment of the present invention and the dampers 170 of the second exemplary embodiment of the present invention, a magnitude of vibration is considerably decreased from 150 dB to 110 dB, compared to the related art, in a frequency band of 250 Hz caused by vehicle vibration.

What is claimed is:

1. An engine mount which couples an engine to a vehicle body, comprising:
    a housing which defines a body of the engine mount;
    a main rubber body installed within the housing and defines a space portion that accommodates a fluid that flows through a nozzle plate;
    a core inserted into and fixed to the main rubber body;
    a fixing bolt coupled to the core;
    a lower support bracket into which the fixing bolt is inserted, wherein the lower support bracket is coupled to the vehicle body; and
    a pair of dampers coupled to a first end and a second end of the lower support bracket, respectively,
    wherein each of the dampers includes
        a base formed in a flat plate shape and penetrated by the fixing bolt;
        a washer coupled to an upper side of the base and having an upper plate and a body that extends downward from the upper plate; and
        a base rubber body which is attached to a surface of the base,
    wherein a washer rubber body is attached to an outer circumferential surface of the body of the washer and a bottom surface of the upper plate of the washer.

* * * * *